United States Patent
Han et al.

(10) Patent No.: US 11,521,153 B2
(45) Date of Patent: Dec. 6, 2022

(54) DISTRIBUTION STATION FOR SERVING UNMANNED LOGISTICS DISTRIBUTION VEHICLES AND DISTRIBUTION METHOD

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Luyi Han, Beijing (CN); Jun Xiao, Beijing (CN); Jinhua Cai, Beijing (CN); Yanguang Liu, Beijing (CN); Chen Fan, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 523 days.

(21) Appl. No.: 16/628,200

(22) PCT Filed: Jun. 22, 2018

(86) PCT No.: PCT/CN2018/092477
§ 371 (c)(1),
(2) Date: Jan. 2, 2020

(87) PCT Pub. No.: WO2019/007215
PCT Pub. Date: Jan. 10, 2019

(65) Prior Publication Data
US 2021/0150455 A1    May 20, 2021

(30) Foreign Application Priority Data

Jul. 3, 2017 (CN) .......................... 201710533262.8
Sep. 22, 2017 (CN) .......................... 201710864856.7

(51) Int. Cl.
*G06Q 10/08* (2012.01)
*B64F 1/32* (2006.01)
(Continued)

(52) U.S. Cl.
CPC ......... *G06Q 10/083* (2013.01); *B64C 39/024* (2013.01); *B64F 1/322* (2020.01);
(Continued)

(58) Field of Classification Search
CPC ........ B65G 1/065; B65G 67/02; B65G 65/00; B65G 63/002; B66F 9/063; G06Q 10/083;
(Continued)

(56) References Cited

U.S. PATENT DOCUMENTS 9,384,668 B2    7/2016  Raptopoulos et al.
9,959,773 B2    5/2018  Raptopoulos et al.
(Continued)

FOREIGN PATENT DOCUMENTS

CN    106570667 A    4/2017
CN    106855966 A    6/2017
(Continued)

OTHER PUBLICATIONS

International Search Report dated Sep. 26, 2018 in PCT/CN2018/092477, 2 pages.

*Primary Examiner* — Glenn F Myers
(74) *Attorney, Agent, or Firm* — Oblon, McClelland, Maier & Neustadt, L.L.P.

(57) ABSTRACT

The present disclosure relates to a distribution station for serving an unmanned logistics distribution vehicle and distribution method. The distribution station includes: a building having a vehicle parking space for parking an unmanned logistics distribution vehicle at least including an unmanned logistics distribution aircraft and an unmanned logistics
(Continued)

distribution ground vehicle; a cargo conveying and loading device disposed within the building, for automatically conveying and loading a cargo to be distributed to an allocated unmanned logistics distribution vehicle parked in the vehicle parking space; and a cargo dispatching device for allocating a corresponding unmanned logistics distribution vehicle to the cargo to be distributed, and providing the unmanned logistics distribution vehicle with guidance information to guide distribution of the unmanned logistics distribution vehicle, so that the unmanned logistics distribution vehicle automatically distributes the cargo to be distributed according to the guidance information.

20 Claims, 3 Drawing Sheets

(51) Int. Cl.
    *B64C 39/02*     (2006.01)
    *B65G 1/06*     (2006.01)
    *B65G 63/00*     (2006.01)
    *B65G 67/02*     (2006.01)
    *B66F 9/06*     (2006.01)

(52) U.S. Cl.
    CPC ........... *B65G 1/065* (2013.01); *B65G 63/002* (2013.01); *B65G 67/02* (2013.01); *B66F 9/063* (2013.01); *B64C 2201/128* (2013.01)

(58) Field of Classification Search
    CPC .. B64F 1/322; B64C 39/024; B64C 2201/128
    See application file for complete search history.

(56) References Cited

U.S. PATENT DOCUMENTS

| | | |
|---|---|---|
| 2014/0032034 A1 | 1/2014 | Raptopoulos et al. |
| 2014/0252168 A1 | 9/2014 | Brody |
| 2015/0379468 A1 | 12/2015 | Harvey |
| 2016/0163204 A1 | 6/2016 | Raptopoulos et al. |
| 2017/0124512 A1 | 5/2017 | Harvey |
| 2018/0137454 A1* | 5/2018 | Kulkarni .............. G05D 1/0027 |

FOREIGN PATENT DOCUMENTS

| | | |
|---|---|---|
| CN | 106886876 A | 6/2017 |
| CN | 105324535 B | 10/2017 |

* cited by examiner

[[[# DISTRIBUTION STATION FOR SERVING UNMANNED LOGISTICS DISTRIBUTION VEHICLES AND DISTRIBUTION METHOD

CROSS-REFERENCE TO RELATED APPLICATIONS

The present application is a U.S. National Stage Application under 35 U.S.C. § 371 of International Patent Application No. PCT/CN2019/007215, filed on Jun. 22, 2018, which is based on and claims priorities to CN Patent Application No. 201710533262.8 filed on Jul. 3, 2017 and CN Patent Application No. 201710864856.7 filed on Sep. 22, 2017, the contents of all which are incorporated by reference herein in their entirety.

TECHNICAL FIELD

The present disclosure relates to the field of logistics distribution, and in particular, to a distribution station for serving an unmanned logistics distribution vehicle and distribution method.

BACKGROUND

In recent years, with rapid development of e-commerce in China, it has gradually become the current mainstream business model. For e-commerce, logistics can often become a bottleneck restricting the development due to its relatively late development. For merchandisers, in order to provide distribution and logistics services to more concentrated consumer groups, distribution stations for cargo can be normally established within or around an area.

In some related arts, manual receipt is applied in a distribution station, and manual inspection, manual unloading, and manual sorting are performed within the distribution station. Then, the sorted parcels are transported and delivered by the courier according to a corresponding destination of the parcel. With the development of logistics automation, various unmanned logistics distribution vehicles have been rapidly developed. Among them, unmanned distribution aerial vehicles and unmanned distribution vehicles have been applied to the transport and delivery of parcels, to partially or fully replacing manual transport and delivery operations, thereby saving the labor that has been occupied. In other related arts, there are also buildings capable of supporting multiple drones for cargo distribution.

SUMMARY

After research, the inventors have found that, although the distribution stations in the related arts are equipped with unmanned distribution aerial vehicles and unmanned distribution vehicles, the unloading, sorting, and loading after arrival of the cargo still need to be completed manually, thus causing a very high labor cost and a low delivery efficiency of the distribution stations. In addition, the buildings supporting drone distribution in the related technology can only support drone distribution, and need to cooperate with manual loading within the buildings, so that their labor cost is still very high. Considering the current distribution capabilities of drones, it is difficult to adapt to the distribution function of substantial batch of heavy cargo, which in turn affects the distribution efficiency.

In view of this, embodiments of the present disclosure provide a distribution station for serving an unmanned logistics distribution vehicle and distribution method, which can reduce the labor cost of the distribution station and improve the distribution efficiency.

According to one aspect of the present disclosure, a distribution station for serving an unmanned logistics distribution vehicle is provided. The distribution station includes:

a building having a vehicle parking space for parking an unmanned logistics distribution vehicle at least including an unmanned logistics distribution aircraft and an unmanned logistics distribution ground vehicle;

a cargo conveying and loading device disposed within the building, for automatically conveying and loading a cargo to be distributed to an allocated unmanned logistics distribution vehicle parked in the vehicle parking space; and a cargo dispatching device for allocating a corresponding unmanned logistics distribution vehicle to the cargo to be distributed, and providing the unmanned logistics distribution vehicle with guidance information to guide distribution of the unmanned logistics distribution vehicle, so that the unmanned logistics distribution vehicle automatically distributes the cargo to be distributed according to the guidance information.

In some embodiments, the vehicle parking space in the building includes a plurality of parking areas, which are provided on at least one of different floors and different compartments of the building according to a type of the unmanned logistics distribution vehicle.

In some embodiments, a parking area of the unmanned logistics distribution aircraft and a parking area of the unmanned logistics ground vehicle are respectively located on different floors of the building.

In some embodiments, the plurality of parking areas are located on at least two floors of the building, and the parking area of the unmanned logistics distribution aircraft is located on a top floor of the at least two floors, and/or the parking area of the unmanned logistics distribution ground vehicle is located on a ground floor of the at least two floors.

In some embodiments, at least partial parking areas in the plurality of parking areas is provided with an automatic charging device for automatically charging the unmanned logistics distribution vehicle being parked.

In some embodiments, the automatic charging device is an automatic charger configured to automatically charge the unmanned logistics distribution vehicle with electrical energy after it is detected that the unmanned logistics distribution vehicle is parked in place.

In some embodiments, the top floor is provided with an unmanned aircraft passage for communicating outside with the parking area of the unmanned logistics distribution aircraft, for entry and exit of the unmanned logistics distribution aircraft.

In some embodiments, the unmanned aircraft passage is located on a building roof on the top floor, and the unmanned aircraft passage is internally provided with a first automatic door capable of automatically opening or closing the unmanned aircraft passage.

In some embodiments, the parking area of the unmanned logistics distribution aircraft and the unmanned aircraft passage are both plural, and each of the parking areas of the unmanned logistics distribution aircraft has a corresponding relationship with each of the unmanned aircraft passages.

In some embodiments, at least two of the plurality of unmanned aircraft passages differ in at least one of a cross-sectional shape and a size to adapt to the unmanned logistics distribution aircraft with a different type/size.

In some embodiments, a plurality of parking areas in the vehicle parking space are located on a plurality of floors, and the parking area of the unmanned logistics distribution aircraft is located in at least one of inner, a top and an exterior extension of the building on other floors than the ground floor in the plurality of floors.

In some embodiments, the exterior extension is capable of being received inside the building in a telescopic or rotary manner.

In some embodiments, the ground floor is provided with an unmanned vehicle passage for communicating outside with the parking area of the unmanned logistics distribution ground vehicle, for entry and exit of the unmanned logistics distribution ground vehicle.

In some embodiments, the unmanned vehicle passage is located on a side wall of the building on the ground floor, and the unmanned vehicle passage is internally provided with a second automatic door capable of automatically opening or closing the unmanned vehicle passage.

In some embodiments, the parking area of the unmanned logistics distribution ground vehicle and the unmanned vehicle passage are both plural, and each of the parking areas of the unmanned logistics distribution ground vehicle has a corresponding relationship with each of the unmanned vehicle passages.

In some embodiments, at least two of the plurality of unmanned vehicle passages differ in at least one of a cross-sectional shape and a size to adapt to the unmanned logistics ground vehicle with a different type/size.

In some embodiments, further including: a cargo receiving device disposed in the building (1), for receiving a single or batch of cargo to be distributed from a distribution unit which comes from outside.

In some embodiments, the external distribution unit includes at least one of a distribution motor vehicle from the outside, an unmanned logistics distribution vehicle from the outside, a distribution trunk aircraft from the outside, and a fixed cargo conveying mechanism connected to the outside.

In some embodiments, the building further includes an external batch distribution passage for parking the distribution motor vehicle, and the cargo receiving device is configured to receive a cargo to be distributed that is incoming in batches from the distribution motor vehicle being parked.

In some embodiments, the external batch distribution passage is provided with a third automatic door capable of automatically opening or closing the external batch distribution passage.

In some embodiments, the unmanned logistics distribution vehicle from the outside includes an unmanned logistics distribution aircraft and/or an unmanned logistics distribution ground vehicle, and the unmanned logistics distribution vehicle from the outside shares at least one of a vehicle parking space and an entry/exit passage with the unmanned logistics distribution vehicle inside the building for distributing the cargo outwards.

In some embodiments, the building further includes an apron for parking the distribution trunk aircraft, and the cargo receiving device is configured to receive the cargo to be distributed that is incoming in batches from the distribution trunk aircraft being parked.

In some embodiments, the cargo receiving device includes a track and a driving mechanism provided within the external batch distribution passage, and the track is capable of cooperating with the distribution motor vehicle being parked so that the cargo within the distribution vehicle or a rack for loading the cargo is received along the track under action of the driving mechanism.

In some embodiments, the building is further internally provided with a temporary cargo storage space for temporarily storing the cargo to be distributed that is received from outside, and the cargo conveying and loading device is configured to automatically convey and load the cargo to be distributed in the temporary cargo storage space onto the allocated unmanned logistics distribution vehicle parked in the vehicle parking space according to allocation information of the cargo dispatching device.

In some embodiments, the plurality of parking areas are located on at least two floors of the building, and the temporary cargo storage space is located on a floor between the floor where a parking area of the unmanned logistics distribution aircraft is located and the floor where a parking area of the unmanned logistics distribution ground vehicle is located;

the cargo conveying and loading device includes at least one of following conveying mechanisms:

a hoist conveying mechanism disposed between the temporary cargo storage space and the parking area of the unmanned logistics distribution aircraft; and a slide conveying mechanism disposed between the temporary cargo storage space and the parking area of the unmanned logistics distribution ground vehicle.

In some embodiments, the plurality of parking areas are located on at least two floors of the building;

the cargo conveying and loading device includes: a wheeled transferring robot configured to move on a floor between the floor where a parking area of the unmanned logistics distribution aircraft is located and the floor where a parking area of the unmanned logistics ground vehicle is located.

In some embodiments, ground of the parking area of the unmanned logistics distribution aircraft is provided with a first hole communicating with an area for movement of the wheeled transferring robot, and the wheeled transferring robot is configured to convey the cargo to be distributed in the temporary cargo storage space below the first hole, and load the cargo to be distributed onto a loading mechanism below the unmanned logistics distribution aircraft through a hoist mechanism.

In some embodiments, an upper floor of the parking area of the unmanned logistics distribution ground vehicle is provided with a second hole communicating with an area for movement of the wheeled transferring robot, and the wheeled transferring robot is configured to convey the cargo to be distributed in the temporary cargo storage space to a side of the second hole, and load the cargo to be distributed onto a loading mechanism below the unmanned logistics distribution ground vehicle through an reversing mechanism.

In some embodiments, the temporary cargo storage space is provided with a rack including a two-sided support structure with an intermediate hollowed-out space for supporting the cargo to be distributed, and the wheeled transferring robot is configured to move to below the two-sided support structure, and remove the cargo to be distributed from the two-sided support structure through the intermediate hollowed-out space by a liftable support mechanism.

In some embodiments, the cargo dispatching device includes:

a cargo information obtaining unit for obtaining relevant information of the cargo to be distributed;

an unmanned vehicle allocating unit for allocating a corresponding unmanned logistics distribution vehicle for at least one of the cargo to be distributed that is received from the external distribution unit and the cargo to be distributed that is temporarily stored in the temporary cargo storage space according to the relevant information of the cargo to be distributed; and a guidance information providing unit for providing the unmanned logistics distribution vehicle with guidance information to guide distribution of the unmanned logistics distribution vehicle according to the relevant information of the cargo to be distributed, so that the unmanned logistics distribution vehicle automatically distributes the cargo to be distributed based on the guidance information.

In some embodiments, the external distribution unit includes an unmanned logistics distribution vehicle from outside, and the cargo information obtaining unit includes an information detecting device disposed in an entry passage of the unmanned logistics distribution vehicle from the outside, and is capable of obtaining at least one of a distribution address and an outline dimension information of the cargo to be distributed in an image recognition manner or a radio frequency recognition manner;

the unmanned vehicle allocating unit is configured to directly allocate a corresponding unmanned logistics distribution vehicle for the cargo loaded on the unmanned logistics distribution vehicle from the outside according to at least one of the distribution address and the outline dimension of the cargo to be distributed, so that the cargo conveying and loading device automatically conveys and loads the cargo loaded on the unmanned logistics distribution vehicle from the outside onto the allocated unmanned logistics distribution vehicle parked in the vehicle parking space.

In some embodiments, the unmanned vehicle allocating unit is configured to preferentially allocate the unmanned logistics distribution aircraft or the unmanned logistics distribution ground vehicle according to one of a destination distance and weight information of the cargo to be distributed.

In some embodiments, the guidance information includes route planning information of the unmanned logistics distribution vehicle.

In some embodiments, each passage of the building is in an enclosed state when there is no entry or exit of an unmanned logistics distribution vehicle and when there is no parking of an external distribution motor vehicle.

In some embodiments, a profile of the circumferential side wall of the building is a cylindrical or convex polygonal prism, and the unmanned vehicle passages are respectively provided in a plurality of directions on the side wall of the building.

In some embodiments, the building is an independent building or a building complex, and the building complex includes a plurality of building units, wherein connecting passages are provided between adjacent building units in the plurality of building units.

In some embodiments, each building unit in the building complex has a plurality of floors, and the connection passages are provided between parts of floors of adjacent building units, and the parking area of the unmanned logistics distribution aircraft is located on at least one of inner, a top, an exterior extension and a connection passage of the building on other floors than the ground floor in the plurality of floors.

In some embodiments, at least partial building units in the building complex are provided with a passage for entry and exit of the unmanned logistics distribution vehicle.

In some embodiments, the unmanned logistics distribution vehicle from the outside includes a cargo loading mechanism for loading cargo to be distributed, which is separable from the unmanned logistics distribution vehicle from the outside, and the cargo conveying and loading device is configured to perform a separation operation on the unmanned logistics distribution vehicle from the outside, and load the cargo loading mechanism being separated together with the cargo to be distributed within the cargo loading mechanism onto the allocated unmanned logistics distribution vehicle parked in the vehicle parking space.

In some embodiments, the cargo dispatching device further includes:

a cargo return and exchange allocating unit for selecting an unmanned logistics distribution vehicle according to a received cargo return and exchange allocation instruction, and providing the unmanned logistics distribution vehicle with guidance information to guide distribution of the unmanned logistics distribution vehicle to arrive at a cargo return and exchange site, so that the unmanned logistics distribution vehicle goes to the cargo return and exchange site to receive a cargo to be returned and exchanged and transport it back to the distribution station according to the guidance information.

According to another aspect of the present disclosure, a distribution method based on the foregoing distribution station for serving an unmanned logistics distribution vehicle is provided. The distribution method includes:

allocating an unmanned logistics distribution vehicle corresponding to a cargo to be distributed for the cargo to be distributed through a cargo dispatching device;

automatically conveying and loading the cargo to be distributed onto an allocated unmanned logistics distribution vehicle parked in a vehicle parking space through a cargo conveying and loading device;

providing the unmanned logistics distribution vehicle with guidance information to guide distribution of the unmanned logistics distribution vehicle through the cargo dispatching device, so that the unmanned logistics distribution vehicle automatically distributes the cargo to be distributed according to the guidance information.

In some embodiments, further including: receiving a single or batch of cargo to be distributed from a distribution unit which comes from outside through a cargo receiving device provided in the building.

In some embodiments, the external distribution unit includes a distribution motor vehicle from the outside, and the building is further provided with an external batch distribution passage for parking the distribution motor vehicle, and the operation of receiving a single or batch of cargo to be distributed includes:

receiving the cargo to be distributed that is incoming in batches from the distribution motor vehicle through the cargo receiving device, when the distribution motor vehicle is parked to the external batch distribution passage.

In some embodiments, the external distribution unit includes an unmanned logistics distribution vehicle from the outside, and the operation of receiving a single or batch of cargo to be distributed includes:

receiving a single or batch of cargo to be distributed from the unmanned logistics distribution vehicle from the outside through the cargo receiving device.

In some embodiments, the building is further internally provided with a temporary cargo storage space for temporarily storing the cargo to be distributed that is received from the outside; the operation of conveying and loading specifically includes:

automatically conveying and loading the cargo to be distributed in the temporary cargo storage space onto the allocated unmanned logistics distribution parked in the vehicle parking space through the cargo conveying and loading device according to the allocation information of the cargo dispatching device.

In some embodiments, the external distribution unit includes an unmanned logistics distribution vehicle from the outside, and the cargo dispatching device includes an information detecting device disposed at an entry passage of the unmanned logistics distribution vehicle from the outside; the operation of allocating an unmanned logistics distribution vehicle specifically includes:

obtaining a distribution address and/or an outline dimension information of the cargo to be distributed in an image recognition manner or in a radio frequency recognition manner through the information detecting device;

allocating an unmanned logistics distribution vehicle corresponding to the cargo to be distributed for the cargo loaded on the unmanned logistics distribution vehicle from the outside through the cargo dispatching device according to the distribution address and/or the outline dimension information of the cargo to be distributed;

the operation of conveying and loading operation specifically includes:

automatically conveying and loading the cargo to be distributed that is loaded on the unmanned logistics distribution vehicle from the outside onto the allocated unmanned logistics distribution vehicle parked in the vehicle parking space through the cargo conveying and loading device.

In some embodiments, further including a step of obtaining relevant information of the cargo to be distributed.

In some embodiments, the operation of providing guidance information specifically includes:

reading the relevant information of the cargo to be distributed through the cargo dispatching device, and providing the unmanned logistics distribution vehicle with the guidance information to guide distribution of the unmanned logistics distribution vehicle according to the relevant information of the cargo to be distributed.

In some embodiments, the operation of allocating an unmanned logistics distribution vehicle specifically includes:

reading the relevant information of the cargo to be distributed through the cargo dispatching device, and preferentially allocating the unmanned logistics distribution aircraft or the unmanned logistics distribution ground vehicle for the cargo to be distributed according to a destination distance and/or weight information of the cargo to be distributed.

In some embodiments, the operation of preferentially allocating specifically includes:

preferentially allocating the unmanned logistics distribution aircraft if at least one of conditions that the destination distance of the cargo to be distributed exceeds a first preset distance threshold and a weight of the cargo to be distributed is lower than a first preset weight threshold is satisfied;

preferentially allocating the unmanned logistics distribution ground vehicle if at least one of the conditions that the destination distance of the cargo to be distributed is lower than a second preset distance threshold and the weight of the cargo to be distributed exceeds a second preset weight threshold is satisfied.

In some embodiments, further including: selecting an unmanned logistics distribution vehicle through the cargo dispatching device according to a cargo return and exchange allocation instruction being received, and providing the unmanned logistics distribution vehicle with guidance information to guide the unmanned logistics distribution vehicle to arrive at a cargo return and exchange site, so that the unmanned logistics distribution vehicle goes to the cargo return and exchange site to receive a cargo to be returned and exchanged and transport it back to the distribution station according to the guidance information.

Therefore, according to the embodiments of the present disclosure, a cargo conveying and loading device is provided in a distribution station, to convey and load the cargo to be distributed onto the allocated unmanned logistics distribution vehicle in a vehicle parking space, and provide guidance information to the unmanned logistics distribution vehicle, so that the cargo to be distributed can be automatically distributed at least by unmanned logistics delivery aircrafts or unmanned logistics delivery ground vehicles, thereby reducing or eliminating the manual involvement in the distribution work within the distribution station. Moreover, it is possible to at least support vehicles such as unmanned logistics distribution aircrafts and unmanned logistics distribution ground vehicles with a higher loading capacity, thereby greatly reducing the labor cost and also efficiently improving the logistics distribution efficiency.

BRIEF DESCRIPTION OF THE DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the accompanying drawings.

DETAILED DESCRIPTION

Figure 1:
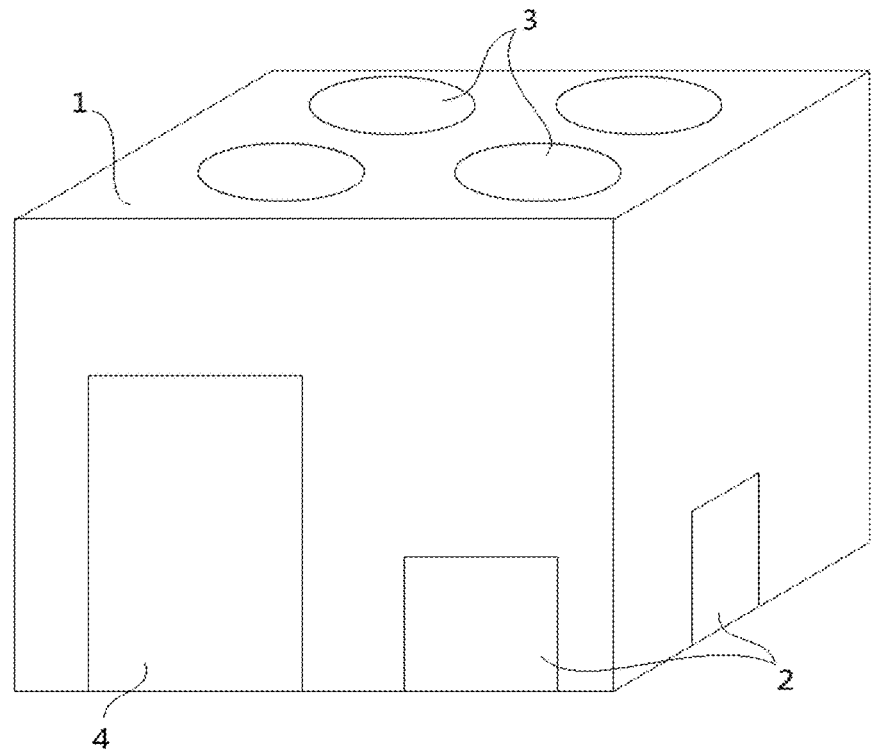
FIG. 1 is a schematic view showing an external structure of a distribution station for serving an unmanned logistics distribution vehicle according to some embodiments of the present disclosure.

Next, the technical solution in the embodiments of the present disclosure will be explicitly and completely described in combination with the drawings in the embodiments of the present disclosure. Apparently, the described embodiments are merely part of the embodiments of the present disclosure, rather than all the embodiments. The following descriptions of at least one exemplary embodiment which are in fact merely descriptive, by no means serve as any delimitation on the present disclosure as well as its application or use. On the basis of the embodiments of the present disclosure, all the other embodiments acquired by a person skilled in the art on the premise that no inventive effort is involved fall into the scope protected by the present disclosure.

The terms "first" and "second" recited in the present disclosure are merely for ease of description, to distinguish different constituent parts having the same name, rather than indicating a sequential or primary-secondary relationship. In the description of the present disclosure, it is necessary to understand that, the orientation or positional relations indicated by various terms, which are based on the orientation or positional relations illustrated by the drawings, are only for facilitating description of the present disclosure, rather than indicating or implying that the device referred thereto has to present a particular orientation, and be constructed and operated in a particular orientation, so that it cannot be understood as limiting the protection scope of the present disclosure Unless additionally specified, the relative arrangements, numerical expressions and numerical values of the components and steps expounded in these examples do not limit the scope of the present invention. At the same time, it should be understood that, in order to facilitate the description, the dimensions of various parts shown in the drawings are not delineated according to actual proportional relations. The techniques, methods, and apparatuses known to a common technical person in the relevant art cannot be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments can have different values. It should be noted that similar reference signs and letters present similar items in the following drawings, and therefore, once an item is defined in a drawing, there is no need for further discussion in the subsequent drawings.

As shown in FIG. 1, it is a schematic view of an external structure of a distribution station for serving an unmanned logistics distribution vehicle according to some embodiments of the present disclosure. In conjunction with an example of the internal structure shown in FIG. 2, the distribution station for serving an unmanned logistics distribution vehicle according to this embodiment includes: a building 1, a cargo conveying and loading device 16, and a cargo dispatching device 17. Among them, the building 1 has a solid external structure, which has a vehicle parking space. The vehicle parking space which is used for parking unmanned logistics distribution vehicles including at least an unmanned logistics distribution aircraft 5 and an unmanned logistics distribution ground vehicle 4, is more flexible and more applicable than the use of a single type of vehicle, for example, in a manner where only an unmanned logistics distribution aircraft is configured to perform distribution.

The cargo conveying and loading device which is disposed within the building 1, has the function of automatically conveying and loading the cargo to be distributed onto the allocated unmanned logistics distribution vehicle parked in the vehicle parking space. The cargo dispatching device includes at least two functions. On one hand, a corresponding unmanned logistics distribution vehicle is allocated to the cargo to be distributed; on the other hand, the guidance information to guide the unmanned logistics distribution vehicle to perform distribution is provided to the unmanned logistics distribution vehicle, so that the unmanned logistics distribution vehicle automatically distributes the cargo to be distributed according to the guidance information.

In the present embodiment, for the cargo in a waiting-to-be-distributed state, if there is a suitable unmanned logistics distribution vehicle in the vehicle parking space, the cargo dispatching device can automatically perform allocation in a corresponding relationship between the cargo to be distributed and the unmanned logistics distribution vehicle. By allocation, the cargo conveying and loading device can convey the cargo to be distributed to the vehicle parking space, and load the cargo to be distributed in the loading space of the allocated unmanned logistics distribution vehicle. It should be noted that, for different cargo conveying and loading devices, the cargo to be distributed can be single or plural. For example, for an unmanned logistics distribution aircraft with a normal loading capacity, a single cargo to be distributed can be loaded, while for an unmanned logistics distribution ground vehicle with a higher loading capacity, plural cargoes to be distributed can be loaded before distribution.

For an unmanned logistics distribution vehicle, before, after or at the same time it is loaded with the cargo to be distributed, the vehicle itself or its control end will also receive the corresponding guidance information, so that the unmanned logistics distribution vehicle automatically departs from the distribution station and goes to the place to be distributed to perform distribution work, and can automatically return or go to the next place after completing the distribution work. Within the distribution station, since the distribution of cargo to the unmanned logistics distribution vehicle and the distribution of the cargo to be distributed by the unmanned logistics distribution vehicle do not require manual involvement, the labor cost is greatly reduced, and the logistics distribution efficiency is also improved.

The vehicle parking space in the building 1 includes a plurality of parking areas, which are arranged on different floors and/or compartments of the building 1 according to the type of the unmanned logistics distribution vehicle. Multiple parking areas can realize the parking of unmanned logistics distribution vehicles with plural numbers and/or plural types. In order to facilitate conveying the allocated cargo, the unmanned logistics distribution vehicle can be alternatively arranged to different floors according to the type of the vehicle, or arranged to the same floor but separated compartments. Take two types of unmanned logistics distribution vehicles as an example, that is, the unmanned logistics distribution vehicles include an unmanned logistics distribution aircraft 5 and an unmanned logistics distribution ground vehicle 4. Considering the operational characteristics of these two types of vehicles, the unmanned logistics distribution aircraft 5 and the unmanned logistics distribution ground vehicle 4 can be respectively arranged on different floors of the building 1 to avoid operational conflicts of different types of vehicles as well as increased difficulty in the design of the internal structure.

The building 1 of the distribution station shown in FIG. 1 is an independent building. In other embodiments, the building 1 can also be a building complex including multiple building units. Connection passages are provided between adjacent building units in these building units. Each building unit in the building complex can have multiple floors, and connecting passages are provided between partial floors of adjacent building units. The parking area of the unmanned logistics distribution aircraft 5 can be located inside, on top of, on an exterior extension and/or connecting passages of the building on other floors than the ground floor in the multiple floors, so as to meet the requirement of concurrent distribution of more unmanned logistics distribution aircrafts 5. For the building complex, at least partial building units therein are provided with passages for entry and exit of the unmanned logistics distribution vehicle.

Figure 2:
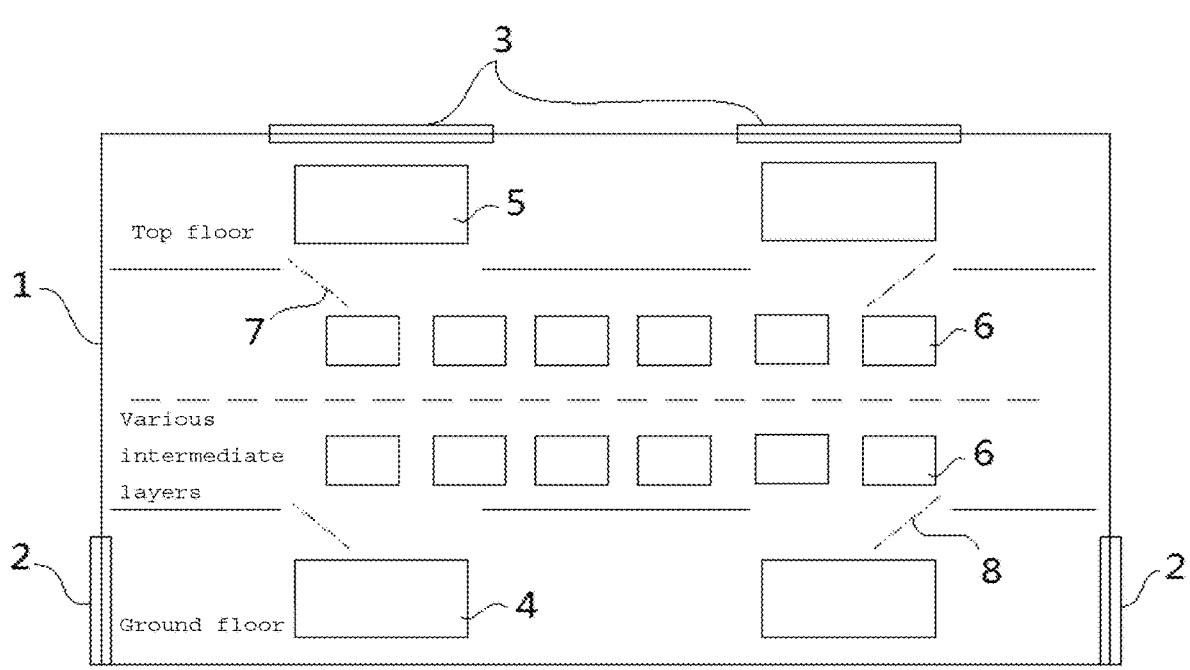
FIG. 2 is a schematic view showing an internal structure of a distribution station for serving an unmanned logistics distribution vehicle according to some embodiments of the present disclosure.

Referring to FIG. 2, a plurality of floors are provided in the building 1, while a plurality of parking areas in the vehicle parking space are located on at least two floors of the building 1. The parking area of the unmanned distribution aircraft 5 can be located on the top floor of at least two floors. The parking area of the unmanned distribution ground vehicle 4 can be located on the ground floor of at least two floors.

For the parking area of the unmanned logistics distribution aircraft 5, in order to facilitate the entry and exit of the unmanned logistics distribution aircraft 5, an unmanned aircraft passage for communicating the outside with the parking area of the unmanned logistics distribution aircraft 5 can be provided on the top floor. The unmanned aircraft passage can be disposed on the side wall or external extension of the top floor, or alternatively on the building roof to simplify the passage structure. Moreover, a first automatic door 3 capable of automatically opening or closing the unmanned aircraft passage can be further provided within the unmanned aircraft passage. The automatic door can open and close the unmanned aircraft passage according to the instructions, and can also open and close the unmanned aircraft passage by inducting a vehicle.

In order to improve the distribution efficiency, the parking area of the unmanned logistics distribution aircraft 5 and the unmanned aircraft passage can be provided to be plural. The parking area of each unmanned logistics distribution aircraft 5 can have a corresponding relationship with each unmanned aircraft passage, so as to reduce the difficulty of deploying the unmanned logistics distribution aircraft 5 within the building. The number of the parking area of the unmanned logistics distribution aircraft 5 can be the same as or different from that of the unmanned aircraft passage, and the corresponding relationship therebetween can be adjusted as necessary.

For a plurality of unmanned aircraft passages, at least two unmanned aircraft passages can have different passage cross-sectional shapes and/or sizes to adapt to different types/sizes of unmanned logistics distribution aircrafts 5, thereby increasing the applicable models of the unmanned logistics distribution aircraft 5. In other embodiments, each of the plurality of unmanned aircraft passages can have the same passage cross-sectional shape and size.

A plurality of parking areas in the vehicle parking space are located on a plurality of floors, wherein the parking area of the unmanned logistics distribution aircraft 5 can be located inside, on top of and/or on an exterior extension of the building on other floors than the ground floor in the plurality of floors. The exterior extension can be provided in such a form as to be fixed relative to the floor on which it is located. In other embodiments, it can also be received inside the building 1 in a telescopic or rotary manner, so as to choose to extend or retract the parking area of the unmanned logistics distribution aircraft 5 as required.

For the parking area of the unmanned logistics distribution ground vehicle 4, in order to facilitate the entry and exit of the unmanned logistics distribution ground vehicle 4, an unmanned vehicle passage for communicating the outside with the parking area of the unmanned logistics distribution ground vehicle 4 can be provided on the ground floor. The unmanned vehicle passage can be located on the side wall of the building on the ground floor, and a second automatic door 2 capable of automatically opening or closing the unmanned vehicle passage can be further provided within the unmanned vehicle passage. The automatic door can open and close the unmanned vehicle passage according to the instructions, and can also open and close the unmanned vehicle passage by inducting a vehicle.

In order to improve the distribution efficiency, there are plural parking areas and unmanned vehicle passages for the unmanned logistics distribution ground vehicle 4. The parking area of each unmanned logistics distribution ground vehicle 4 can have a corresponding relationship with each unmanned vehicle passage, so as to reduce the difficulty of deploying the unmanned logistics distribution ground vehicles 4 within the building. The number of the parking area of the unmanned logistics distribution ground vehicle 4 can be the same as or different from that of the unmanned vehicle passage, and the corresponding relationship therebetween can be adjusted as required. In order to facilitate providing a plurality of unmanned vehicle passages being conflict-free with each other, the profile cross-section of the circumferential side wall of the building 1 is circular or convex polygonal, and the unmanned vehicle passages are respectively provided in a plurality of directions on the side wall of the building.

For a plurality of unmanned vehicle passages, at least two of the unmanned vehicle passages have different passage cross-sectional shapes and/or sizes to adapt to different types/sizes of unmanned logistics distribution ground vehicle 4, thereby increasing the applicable models of the unmanned logistics distribution ground vehicle 4. In other embodiments, each of the plurality of unmanned vehicle passages can have the same passage cross-sectional shape and size.

In addition, an area dedicated to vehicle charging can be provided within the building 1, and the unmanned distribution vehicle can automatically go to the area or be guided to the area for charging. In other embodiments, an automatic charging device can be directly provided in at least partial parking areas of the plurality of parking areas, to automatically charge the unmanned logistics distribution vehicle parked in the parking area. In other words, automatic charging can be performed when the unmanned logistics distribution vehicle is parked in place, thereby saving the labor for charging operation, and also making the unmanned logistics distribution vehicle in an available state for more time.

The automatic charging device can be provided according to the type of energy used by the unmanned logistics distribution vehicle, for example by automatic replenishment of fossil energy, electrical energy, steam energy, hydrogen energy and the like. Considering that the existing unmanned logistics distribution vehicles are mostly driven by electric energy, the automatic charging device can use an automatic charger, which can automatically charge the unmanned logistics distribution vehicles with electrical energy in a wired or wireless manner after detecting that the unmanned logistics distribution vehicles are parked in place.

For a distribution station, in addition to the distribution of cargo, it can also receive cargo to be distributed. For example, a large number of cargoes to be distributed are received in batches, and then the distribution work of a single cargo or a small number of cargoes are accomplished by itself. In order to effectuate receiving the cargo to be distributed, a cargo receiving device 18 can be further provided in the building 1. The cargo receiving device 18 can receive single or batch of cargo to be distributed from a distribution unit which comes from the outside. The external distribution unit can specifically include at least one of a distribution motor vehicle from the outside, an unmanned logistics distribution vehicle from the outside, a distribution trunk aircraft from the outside, or a fixed cargo conveying mechanism connected to the outside.

For the case where the external distribution unit includes a distribution motor vehicle from the outside, an external batch distribution passage can be provided in the building 1. The external batch distribution passage is configured to park the distribution motor vehicle from the outside. The cargo receiving device can receive the cargo to be distributed that is incoming in batches from the parked distribution motor vehicle. The distribution vehicle from the outside which can be a manned or an unmanned distribution motor vehicle, can allocate the cargo to be distributed regularly or according to the storage situation of the station.

When the external distribution motor vehicle is docked with the cargo receiving device of the building 1, the cargo receiving device can receive the cargo to be distributed that is incoming in batches from the distribution motor vehicle, and store the cargo to be distributed inside the building 1, or sort the cargo to be distributed into the unmanned logistic distribution vehicle. The cargo receiving device can include a track and a driving mechanism provided within the external batch distribution passage, wherein the rail cooperates with the parked distribution vehicle in a docking manner to receive the cargo within the distribution motor vehicle or the rack for loading the cargo along the track under the action of the driving mechanism. A third automatic door 15 capable of automatically opening or closing the external batch distribution passage can be provided in the external batch distribution passage. The third automatic door 15 can open or close when receiving an instruction, or can open when an external unmanned or manned distribution vehicle is inducted, so that the distribution motor vehicle can be parked in place, thereby effectuating docking the distribution motor vehicle with the track of the cargo receiving device. The cargo dispatching device can register the cargo entering the station in batches when the cargo is received.

For the case where the external distribution unit includes an unmanned logistics distribution vehicle from the outside, the unmanned logistics distribution vehicle from the outside includes an unmanned logistics distribution aircraft and/or an unmanned logistics distribution ground vehicle. In the present embodiment, the unmanned logistics distribution aircraft and/or the unmanned logistics distribution ground vehicle can either input the cargo to be distributed to the distribution station, or output the cargo to be distributed to the distribution destination from the distribution station. In order to save the internal space and passage of the distribution station, the unmanned logistics distribution vehicle from the outside can be made to share the vehicle parking space with the unmanned logistics distribution vehicle inside the building 1 for outwardly distributing the cargo. The unmanned logistics distribution vehicle from the outside and the unmanned logistics distribution vehicle inside the building 1 can also share the passage for entry and exit of the unmanned logistics distribution vehicle.

These unmanned logistics distribution vehicles from the outside can also include a cargo loading mechanism for loading the cargo to be distributed. In some embodiments, the unloading manner of the cargo loading mechanism is to unload the cargo to be distributed from the cargo loading mechanism. In other embodiments, it is possible to use such a manner that the cargo loading mechanism together with the cargo to be distributed within the cargo loading mechanism is removed. That is, the cargo loading mechanism can be separated from the unmanned logistics distribution vehicle from the outside, and the corresponding cargo conveying and loading device can perform a separation operation on the unmanned logistics distribution vehicle from the outside, such that the separated cargo loading mechanism together with the cargo to be distributed within the cargo loading mechanism is loaded onto the allocated unmanned logistics distribution vehicle parked in the vehicle parking space. In this way, the unmanned logistics distribution vehicle in which the cargo loading mechanism is removed can return immediately without having to stay within the present distribution station, thereby improving the distribution efficiency.

For the case where the external distribution unit includes a distribution trunk aircraft from the outside, the building 1 can also include a corresponding apron for parking the distribution trunk aircraft from the outside, so that the cargo receiving device can receive the cargo to be distributed that is incoming in batches from the parked distribution trunk aircraft. The distribution trunk aircraft can transport a large number of cargo to be distributed into the distribution station one or more times, or transport the cargo return and exchange from the distribution station where it is parked to the warehouse for subsequent processing, or transport partial cargo in the distribution station where it is parked to another distribution station according to the dispatching requirements.

For the case where the external distribution unit includes a fixed cargo conveying mechanism connected to the outside, the fixed cargo transport mechanism can be a remote conveyor belt, wherein another distribution station or an external cargo transport vehicle can be on one end of the conveyor belt.

In the previous partial embodiments, it is mentioned that the building 1 has a solid external structure, which is provided with a passage for entry and exit of the unmanned logistics distribution vehicle, and an external batch distribution passage. Considering the safety of the building 1 to prevent the invasion of external objects, all the passages of the building 1 are in an enclosed state when there are no entry and exit of unmanned logistics distribution vehicles as well as parking of external distribution motor vehicles from the outside.

In the distribution station, the received cargo to be distributed can choose a proper sorting manner according to multiple factors such as station structure, process arrangement and the like. For example, sorting is performed while receiving is being performed, and the received cargo to be distributed is conveyed and loaded onto the allocated unmanned logistics distribution vehicle by the cargo conveying and loading device, so as to improve the distribution efficiency. Alternatively, the received cargo to be distributed in the building 1 is temporarily stored in the building and then the allocation of the corresponding unmanned logistics distribution vehicle is scheduled, so as to coordinate the distribution capacity of limited unmanned logistics distribution vehicles for a number of cargoes. For the latter sorting manner, a temporary cargo storage space can be further provided within the building 1 for temporarily storing the received cargo to be distributed from the outside. Correspondingly, the cargo conveying and loading device can automatically convey and load the cargo to be distributed in the temporary cargo storage space onto the allocated unmanned logistics distribution vehicle parked in the vehicle parking space according to the allocation information of the cargo dispatching device.

Within the building 1 having a plurality of floors, a plurality of parking areas in the vehicle parking space are located on at least two floors, while the temporary cargo storage space can be provided on the floor between the floor where the parking area of the unmanned logistics distribution aircraft 5 is located and the floor where the parking area of the unmanned logistics distribution ground vehicle 4 is located. In order to stably and smoothly load the cargo to be distributed onto the allocated vehicle, the cargo conveying and loading device can include a hoist conveying mechanism 7 disposed between the temporary cargo storage space and the parking area of the unmanned logistics distribution aircraft 5, and/or a slide conveying mechanism 8 disposed between the temporary cargo storage space and the parking area of the unmanned logistic distribution ground vehicle 4. The hoist conveying mechanism 7 and the slide conveying mechanism 8 can both employ a continuous conveying mechanism such as a conveyor belt.

In other embodiments, the cargo conveying and loading device can also use a robot or an AGV to perform the internal convey of the cargo to be distributed. For example, the cargo conveying and loading device includes a wheeled transferring robot (such as an AGV in which an unloading mechanism is added). For the instance that a plurality of parking areas in the vehicle parking space are located on at least two floors of the building 1, the wheeled transferring robot can move on the floor between the floor where the parking area of the unmanned logistics distribution aircraft 5 is located and the floor where the parking area of the unmanned logistics distribution ground vehicle 4 is located.

Figure 3:
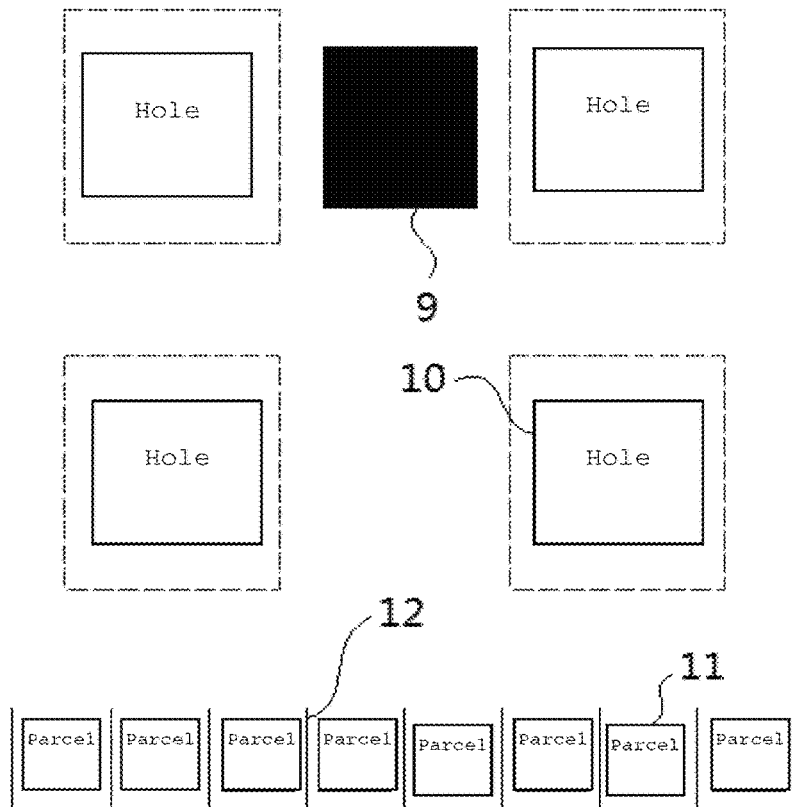
FIG. 3 is a schematic view showing a spatial relationship between a temporary cargo storage space and a parking area of an unmanned logistics distribution vehicle for a distribution station for serving an unmanned logistics distribution vehicle according to some embodiments of the present disclosure.

Referring to FIG. 3, the floor where the parking area of the unmanned logistics distribution vehicle is located and the area for movement of the wheeled transferring robot 9 can be communicated therebetween via a hole 10 provided in the parking area of the unmanned logistics distribution vehicle, so as to effectuate cross-layer convey of the cargo to be distributed. The wheeled transferring robot 9 can take out the cargo to be distributed (for example, the parcel 11 or the like in FIG. 3) from the rack 12 provided in the temporary cargo storage space according to the dispatch instruction, and then move to the vicinity of the hole 10 corresponding to the parking area of the corresponding unmanned logistics distribution vehicle according to the dispatch instruction. Then, the parcel 11 is loaded onto the unmanned logistics distribution vehicle through the hole 10 by the unloading mechanism.

Figure 4:
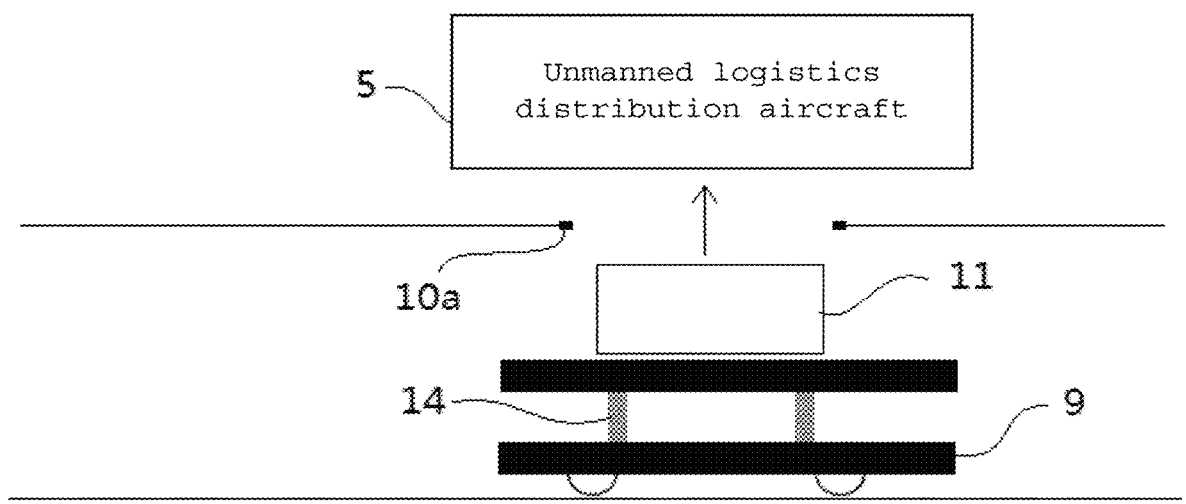
FIG. 4 is a schematic view showing a wheeled transferring robot loading parcels to an unmanned logistics distribution aircraft for a distribution station for serving an unmanned logistics distribution vehicle according to some embodiments of the present disclosure.
Figure 5:
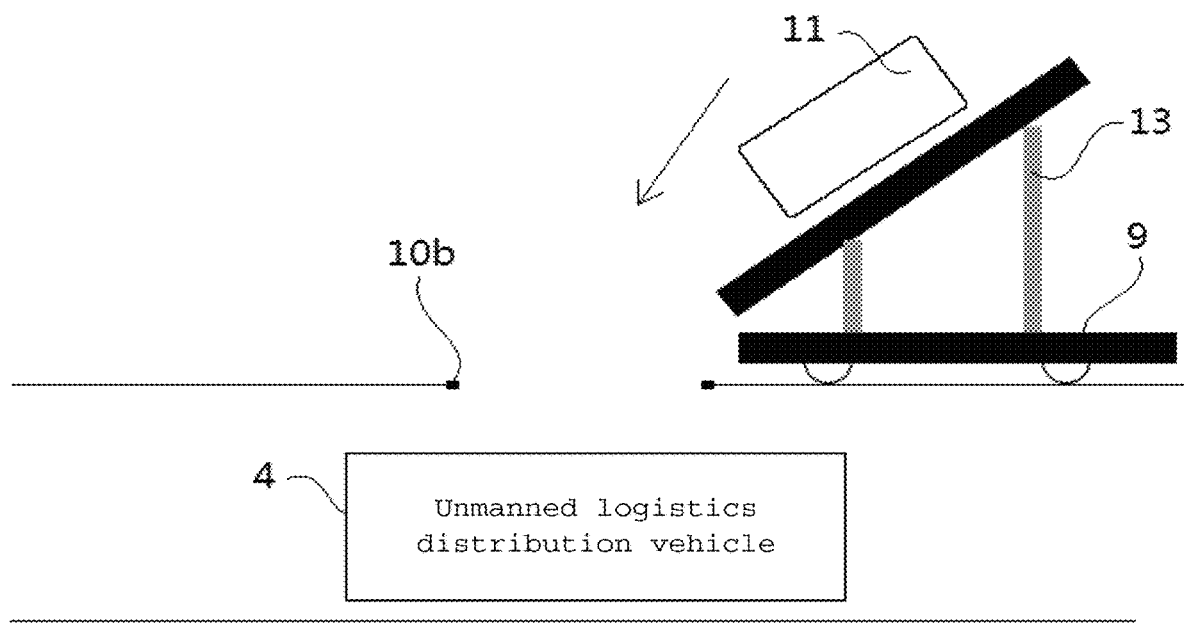
FIG. 5 is a schematic view showing a wheeled transferring robot loading parcels to an unmanned logistics distribution ground vehicle for a distribution station for serving an unmanned logistics distribution vehicle according to some embodiments of the present disclosure.

Referring to FIG. 4, the ground of the parking area of the unmanned logistics distribution aircraft 5 can be provided with a first hole 10*a* communicating with the area for movement of the wheeled transferring robot 9. The wheeled transferring robot 9 can convey the cargo to be distributed (for example, parcel 11 or the like) in the temporary cargo storage space to below the first hole 10*a*, and load the cargo to be distributed into the loading mechanism below the unmanned logistics distribution aircraft 5 through the hoist mechanism 14. FIG. 5 shows a form in which the upper floor of the parking area of the unmanned logistics distribution ground vehicle 4 is provided with a second hole 10*b* communicating with the area for movement of the wheeled transferring robot 9. The wheeled transferring robot 9 can convey the cargo to be distributed (for example, the parcel 11 or the like) in the temporary cargo storage space to a side of the second hole 10*b*, so that the cargo to be distributed falls from the second hole 10*b* by means of an reversing mechanism 13, and is loaded on the loading mechanism below the unmanned logistics distribution ground vehicle 4.

Figure 6:
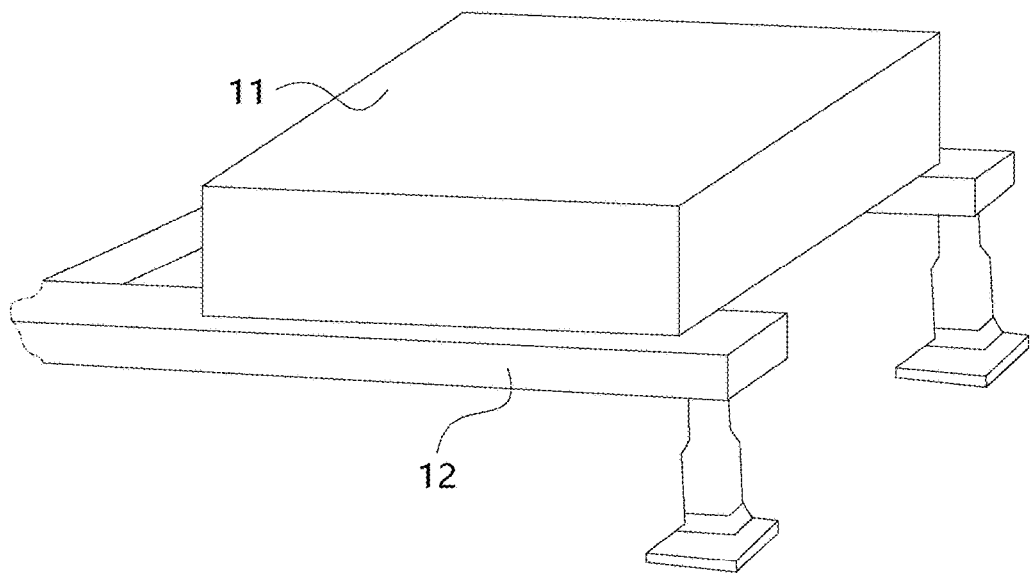
FIG. 6 is a schematic view showing a partial structure of a rack for a distribution station for serving an unmanned logistics distribution vehicle according to some embodiments of the present disclosure.

In order to facilitate removing the cargo to be distributed from the rack 12, referring to FIG. 6, the rack can include a two-sided support structure with an intermediate hollowed-out space to support the cargo to be distributed. The wheeled transferring robot can move to below the two-sided support structure, and can remove the cargo to be distributed from the two-sided support structure through the intermediate hollowed-out space through a liftable support mechanism.

In the present embodiment, the cargo dispatching device can include: a cargo information obtaining unit, an unmanned vehicle allocating unit, and a guidance information providing unit. The cargo information obtaining unit is configured to obtain relevant information of the cargo to be distributed. The relevant information of the cargo to be distributed here can include at least one of order information, cargo weight, destination distance, distribution address, and outline dimension. This relevant information can be obtained directly when the cargo is scanned, or further calculated by preset algorithms after some indirect data is obtained.

The unmanned vehicle allocating unit is configured to allocate the unmanned logistics distribution vehicles corresponding to the cargo to be distributed that is received from the external distribution unit and/or the cargo to be distributed temporarily stored in the temporary cargo storage space according to the relevant information of the cargo to be distributed. The guidance information providing unit is configured to provide the unmanned logistics distribution vehicle with guidance information to guide distribution of the unmanned logistics distribution vehicle according to the relevant information of the cargo to be distributed, so that the unmanned logistics distribution vehicle can automatically distribute the cargo to be distributed based on the guidance information. The guidance information here can include route planning information of the unmanned logistics distribution vehicle, and can also include order information.

For the cargo dispatching device, it can also continuously receive real-time location and status information sent by the unmanned logistics distribution vehicle being outgoing, and further provide guidance information based on this information.

For the case where the external distribution unit includes an unmanned logistics distribution vehicle from the outside, the cargo information obtaining unit can include an information detecting device provided in an entry passage of the unmanned logistics distribution vehicle from the outside. The information detecting device can obtain the distribution address and/or the outline dimension information of the cargo to be distributed in an image recognition manner or a radio frequency recognition manner. The unmanned vehicle allocating unit can directly allocate the corresponding unmanned logistics distribution vehicle for the cargo loaded on the unmanned logistics distribution vehicle from the outside according to the distribution address and/or outline dimension information of the cargo to be distributed, so that the cargo conveying and loading device automatically conveys and loads the cargo to be distributed on the unmanned logistics distribution vehicle from the outside onto the allocated unmanned logistics distribution vehicle parked in the vehicle parking space, thereby realizing the sorting link at the entrance passage of the vehicle and greatly improving the distribution efficiency.

For the unmanned vehicle allocating unit, when it allocates a vehicle to the cargo to be distributed, it can examine the destination distance and/or weight information of the cargo to be distributed, for determining to preferentially allocate the unmanned logistics distribution aircraft 5 or the unmanned logistics distribution ground vehicle 4. For example, if the destination distance of the cargo to be distributed exceeds the first preset distance threshold, the unmanned logistics distribution aircraft 5 is preferentially allocated so that the advantage of long-distance distribution can be realized by utilizing a fast flight speed and a strong obstacle performance of the unmanned logistics distribution aircraft 5. If the weight of the cargo to be distributed is lower than the first preset weight threshold, the unmanned logistics distribution aircraft 5 is also preferentially allocated to meet the characteristics of the existing unmanned logistics distribution aircraft 5 with limited carrying capacity but rapid return. For the unmanned logistics distribution aircraft 5, when it is selected as the allocated unmanned logistics distribution vehicle, the conditions of the above-described destination distance and weight information can also both be incorporated.

For another example, if the destination distance of the cargo to be distributed is lower than the second preset distance threshold, the unmanned logistics distribution ground vehicle 4 is preferentially allocated, so as to utilize the characteristics of the unmanned logistics distribution ground vehicle 4 with a short travel distance but a strong carrying capacity. If the weight of the cargo to be distributed exceeds the second preset weight threshold, the unmanned logistics distribution ground vehicle 4 is also preferentially allocated to utilize the advantage of the strong loading capacity of the unmanned logistics distribution ground vehicle 4. For the unmanned logistics distribution ground vehicle 4, the above-described conditions of the destination distance and the weight information can also both be incorporated when it is selected as the allocated unmanned logistics distribution vehicle.

In addition to the functional units having the above-described dispatching function, the cargo dispatching device can further include a cargo return and exchange allocating unit. The cargo return and exchange allocating unit is configured to select an unmanned logistics distribution vehicle according to the received cargo return and exchange allocation instruction, and provide the unmanned logistics distribution vehicle with guidance information to guide the unmanned logistics distribution vehicle to arrive at the cargo return and exchange site, so that the unmanned logistics distribution vehicle can go to the cargo return and exchange site to receive the cargo to be returned and transport it back to the distribution station according to the guidance information. This greatly saves the labor and material resources occupied by the cargo return and exchange process.

The above-described embodiments of the distribution station for serving an unmanned logistics distribution vehicle can greatly reduce the use of labor within the station, and can even realize an unmanned logistic distribution station by scheduling the internal devices completely by the distribution station itself or the remote-control platform. Based on the above-described embodiments of the distribution station of the present disclosure, the distribution method can include:

allocating an unmanned logistics distribution vehicle corresponding to a cargo to be distributed for the cargo to be distributed through the cargo dispatching device;

automatically conveying and loading the cargo to be distributed onto the allocated unmanned logistics distribution vehicle parked in the vehicle parking space through the cargo conveying and loading device;

providing the unmanned logistics distribution vehicle with guidance information to guide distribution of the unmanned logistics distribution vehicle through the cargo dispatching device, so that the unmanned logistics distribution vehicle automatically distributes the cargo to be distributed according to the guidance information.

In another embodiment, the building 1 can be further provided with a cargo receiving device, and the corresponding distribution method can further include: receiving a single or batch of cargo to be distributed from a distribution unit which comes from the outside through the cargo receiving device.

For the case where the external distribution unit includes a distribution motor vehicle from the outside, the building 1 is further provided with an external batch distribution passage for parking the distribution motor vehicle from the outside. Correspondingly, the operation of receiving a single or batch of cargo to be distributed from the distribution unit which comes from the outside through the cargo receiving device includes: receiving the cargo to be distributed that is incoming in batches from the distribution motor vehicle through the cargo receiving device when the external distribution motor vehicle is parked to the external batch distribution passage.

For the case where the external distribution unit includes an unmanned logistics distribution vehicle from the outside, the operation of receiving a single or batch of cargo to be distributed from the distribution unit which comes from the outside through the cargo receiving device includes: receiving a single or batch of cargo to be distributed from the unmanned logistics distribution vehicle from the outside through the cargo receiving device.

In another embodiment, the building 1 can be further internally provided with a temporary cargo storage space, for temporarily storing the cargo to be distributed that is received from the outside. Correspondingly, the operation of automatically conveying and loading the cargo to be distributed onto the allocated unmanned logistics distribution vehicle parked in the vehicle parking space through the cargo conveying and loading device specifically includes: automatically conveying and loading the cargo to be distributed in the temporary cargo space onto the allocated unmanned logistics distribution vehicle parked in the vehicle parking space through the cargo conveying and loading device, according to the allocation information of the cargo dispatching device.

For the case where the external distribution unit includes an unmanned logistics distribution vehicle from the outside, the cargo dispatching device can include an information detecting device provided in an entry passage of the unmanned logistics distribution vehicle from the outside. The operation of allocating the corresponding unmanned logistics distribution vehicle for the cargo to be distributed through the cargo dispatching device can specifically include:

obtaining the distribution address and/or the outline dimension information of the cargo to be distributed in an image recognition manner or a radio frequency recognition manner through the information detecting device;

directly allocating a corresponding unmanned logistics distribution vehicle for the cargo loaded on the unmanned logistics distribution vehicle from the outside through the cargo dispatching device according to the distribution address and/or the outline dimension information of the cargo to be distributed.

Correspondingly, the operation of automatically conveying and loading the cargo to be distributed onto the allocated unmanned logistics distribution vehicle parked in the vehicle parking space through the cargo conveying and loading device can specifically include: automatically conveying and loading the cargo to be distributed that is loaded on the unmanned logistics distribution vehicle from the outside onto the allocated unmanned logistics distribution vehicle parked in the vehicle parking space through the cargo conveying and loading device.

For the distribution station, when it receives the cargo to be distributed, it can obtain the relevant information of the cargo to be distributed, and can allocate and guide the vehicle based on the obtained relevant information. The operation of providing the unmanned logistics distribution vehicle with guidance information to guide distribution of the unmanned logistics distribution vehicle through the cargo dispatching device can specifically include: reading the relevant information of the cargo to be distributed through the cargo dispatching device, and providing the unmanned logistics distribution vehicle with guidance information to guide distribution of the unmanned logistics distribution vehicle according to the relevant information of the cargo to be distributed.

The operation of allocating the corresponding unmanned logistics distribution vehicle to the cargo to be distributed through the cargo dispatching device can specifically include: reading the relevant information of the cargo to be distributed through the cargo dispatching device, and preferentially allocating the unmanned logistics distribution aircraft 5 or the unmanned logistics distribution ground vehicle 4 according to the destination distance and/or weight information of the cargo to be distributed. Specifically, if the destination distance of the cargo to be distributed exceeds the first preset distance threshold and/or the weight is lower than the first preset weight threshold, the unmanned logistics distribution aircraft 5 is preferentially allocated. If the destination distance of the cargo to be distributed is lower than the second preset distance threshold and/or the weight exceeds the second preset weight threshold, the unmanned logistics distribution ground vehicle 4 is preferentially allocated.

In order to make a more smooth cargo return and exchange process and save the labor and material resources, the distribution method can further include: selecting an unmanned logistics distribution vehicle according to the received cargo return and exchange allocation instruction, and providing the unmanned logistics distribution vehicle with guidance information to guide the unmanned logistics distribution vehicle to arrive at the cargo return and exchange site through the cargo dispatching device, so that the unmanned logistics distribution vehicle can go to the cargo return and exchange site to receive the cargo to be returned and exchanged and transport it back to the distribution station according to the guidance information.

For more processes and descriptions of the distribution method based on the distribution station of the present disclosure, please refer to the above-described description of the implemented functions and processes of the various embodiments of the distribution station, which will not be described in detail here.

Finally, it should be explained that: the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

What is claimed is:

1. A distribution station for serving an unmanned logistics distribution vehicle, comprising:
    a building having a vehicle parking space configured to park an unmanned logistics distribution vehicle at least comprising an unmanned logistics distribution aircraft and an unmanned logistics distribution ground vehicle;
    a cargo conveying and loading device disposed within the building configured to automatically convey and load a cargo to be distributed to an allocated unmanned logistics distribution vehicle parked in the vehicle parking space; and
    a cargo dispatching device configured to allocate a corresponding unmanned logistics distribution vehicle to the cargo to be distributed, and providing the unmanned logistics distribution vehicle with guidance information to guide distribution of the unmanned logistics distribution vehicle, so that the unmanned logistics distribution vehicle automatically distributes the cargo to be distributed according to the guidance information, wherein
    the cargo dispatching device is configured to allocate another unmanned logistics distribution vehicle to the cargo loaded on an unmanned logistics distribution vehicle from outside, and
    the cargo conveying and loading device is configured to automatically convey and load the cargo loaded on an unmanned logistics distribution vehicle from the outside onto the another unmanned logistics distribution vehicle parked in the vehicle parking space.

2. The distribution station according to claim 1, wherein the vehicle parking space comprises a plurality of parking areas located on a plurality of floors,
    the parking area of the unmanned logistics distribution aircraft is located in an exterior extension of the building on other floors than the ground floor in the plurality of floors, and
    the exterior extension is capable of being received inside the building in a telescopic or rotary manner.

3. The distribution station according to claim 1, wherein a ground floor of the building is provided with a plurality of unmanned vehicle passages for communicating outside with the parking area of the unmanned logistics distribution ground vehicle, for entry and exit of the unmanned logistics distribution ground vehicle, and at least two of the plurality of unmanned vehicle passages differ in a cross-sectional shape and/or a size to adapt to the unmanned logistics ground vehicle with a different type/size.

4. The distribution station according to claim 1, wherein the another unmanned logistics distribution vehicle from the outside comprises an unmanned logistics distribution aircraft and/or an unmanned logistics distribution ground vehicle, and
    the unmanned logistics distribution vehicle from the outside shares at least one of a vehicle parking space and an entry/exit passage with the unmanned logistics distribution vehicle inside the building for distributing the cargo outwards.

5. The distribution station according to claim 1, wherein the building further comprises an apron configured to park a distribution trunk aircraft, and
    the distribution station further comprises the cargo receiving device configured to receive the cargo to be distributed that is incoming in batches from the distribution trunk aircraft being parked.

6. The distribution station according to claim 1, wherein
the vehicle parking space comprises a plurality of parking areas located on at least two floors of the building,
a temporary cargo storage space is arranged in the building on a floor between the floor where a parking area of the unmanned logistics distribution aircraft is located and the floor where a parking area of the unmanned logistics distribution ground vehicle is located, so as to temporarily store the cargo to be distributed that is received from outside,
the cargo conveying and loading device is configured to automatically convey and load the cargo to be distributed in the temporary cargo storage space onto the allocated unmanned logistics distribution vehicle parked in the vehicle parking space according to allocation information of the cargo dispatching device, and
the cargo conveying and loading device comprises:
a hoist conveying mechanism disposed between the temporary cargo storage space and the parking area of the unmanned logistics distribution aircraft; and
a slide conveying mechanism disposed between the temporary cargo storage space and the parking area of the unmanned logistics distribution ground vehicle.

7. The distribution station according to claim 1, wherein
the vehicle parking space comprises a plurality of parking areas located on at least two floors of the building,
a temporary cargo storage space is arranged in the building on a floor between the floor where a parking area of the unmanned logistics distribution aircraft is located and the floor where a parking area of the unmanned logistics distribution ground vehicle is located, so as to temporarily store the cargo to be distributed that is received from outside, and
the cargo conveying and loading device comprises: a wheeled transferring robot configured to move on a floor between the floor where a parking area of the unmanned logistics distribution aircraft is located and the floor where a parking area of the unmanned logistics ground vehicle is located.

8. The distribution station according to claim 7, wherein a ground of the parking area of the unmanned logistics distribution aircraft is provided with a first hole communicating with an area for movement of the wheeled transferring robot, and
the wheeled transferring robot is configured to convey the cargo to be distributed in the temporary cargo storage space below the first hole, and load the cargo to be distributed onto a loading mechanism below the unmanned logistics distribution aircraft through a hoist mechanism.

9. The distribution station according to claim 7, wherein
an upper floor of the parking area of the unmanned logistics distribution ground vehicle is provided with a second hole communicating with an area for movement of the wheeled transferring robot, and
the wheeled transferring robot is configured to convey the cargo to be distributed in the temporary cargo storage space to a side of the second hole, and load the cargo to be distributed onto a loading mechanism below the unmanned logistics distribution ground vehicle through an reversing mechanism.

10. The distribution station according to claim 7, wherein
the temporary cargo storage space is provided with a rack comprising a two-sided support structure with an intermediate hollowed-out space for supporting the cargo to be distributed, and
the wheeled transferring robot is configured to move to below the two-sided support structure, and remove the cargo to be distributed from the two-sided support structure through the intermediate hollowed-out space by a liftable support mechanism.

11. The distribution station according to claim 6, wherein
the cargo dispatching device comprises an information detecting device disposed in an entry passage of the unmanned logistics distribution vehicle from the outside, and
the information detecting device is configured to obtain at least one of a distribution address and an outline dimension information of the cargo to be distributed in an image recognition manner or a radio frequency recognition manner.

12. The distribution station according to claim 3, wherein
a profile cross-section of the circumferential side wall of the building is circular or convex polygonal, and
the unmanned vehicle passages are respectively penetrated through the side wall of the building in a plurality of directions.

13. The distribution station according to claim 1, wherein
the building is an independent building or a building complex,
the building complex comprises a plurality of building units,
connecting passages are formed between adjacent building units in the plurality of building units,
each building unit in the building complex has a plurality of floors,
the connection passages are formed between parts of floors of adjacent building units,
the parking area of the unmanned logistics distribution aircraft is located on at least one of inner, a top, an exterior extension and a connection passage of the building on other floors than the ground floor in the plurality of floors, and
at least parts of building units in the building complex are provided with a passage for entry and exit of the unmanned logistics distribution vehicle.

14. The distribution station according to claim 1, wherein
the unmanned logistics distribution vehicle from the outside comprises a cargo loading mechanism for loading cargo to be distributed, which is separable from the unmanned logistics distribution vehicle from the outside, and
the cargo conveying and loading device is configured to separate the cargo loading mechanism from the unmanned logistics distribution vehicle from the outside, and load the cargo loading mechanism being separated together with the cargo to be distributed within the cargo loading mechanism onto the allocated unmanned logistics distribution vehicle parked in the vehicle parking space.

15. The distribution station according to claim 1, wherein
the cargo dispatching device is configured to
select an unmanned logistics distribution vehicle according to a received cargo return and exchange allocation instruction, and provide the unmanned logistics distribution vehicle with guidance information to guide distribution of the unmanned logistics distribution vehicle to arrive at a cargo return and exchange site, so that the unmanned logistics distribution vehicle goes to the cargo return and exchange site to receive a cargo to be returned and exchanged and transport it back to the distribution station according to the guidance information.

16. A distribution method based on a distribution station, comprising:
    allocating a corresponding unmanned logistics distribution vehicle in the distribution station to a cargo to be distributed which is loaded on an unmanned logistics distribution vehicle from outside of the distribution station;
    automatically conveying and loading the cargo to be distributed which is loaded on an unmanned logistics distribution vehicle from outside of the distribution station onto the allocated unmanned logistics distribution vehicle parked in a vehicle parking space of the distribution station; and
    providing the unmanned logistics distribution vehicle with guidance information to guide distribution of the unmanned logistics distribution vehicle, so that the unmanned logistics distribution vehicle automatically distributes the cargo to be distributed according to the guidance information.

17. The distribution method according to claim 16, wherein a temporary cargo storage space is arranged in the building to temporarily store the cargo to be distributed that is received from the outside; and
    the distribution method further comprises:
    allocating a corresponding unmanned logistics distribution vehicle in the distribution station to the cargo in the temporary cargo storage space; and
    automatically conveying and loading the cargo to be distributed in the temporary cargo storage space onto the allocated unmanned logistics distribution parked in the vehicle parking space.

18. The distribution method according to claim 16, wherein
    the distribution station comprises an information detecting device disposed at an entry passage of the unmanned logistics distribution vehicle from the outside of the distribution station; and
    the operation of allocating an unmanned logistics distribution vehicle specifically comprises:
    obtaining a distribution address and/or an outline dimension information of the cargo to be distributed in an image recognition manner or in a radio frequency recognition manner through the information detecting device;
    allocating a corresponding unmanned logistics distribution vehicle to the cargo to be distributed which is loaded on the unmanned logistics distribution vehicle from the outside of the distribution station according to the distribution address and/or the outline dimension information of the cargo to be distributed.

19. The distribution method according to claim 16, further comprising:
    obtaining relevant information of the cargo to be distributed;
    wherein the step of providing guidance information specifically comprises:
    providing the unmanned logistics distribution vehicle with the guidance information to guide distribution of the unmanned logistics distribution vehicle according to the relevant information of the cargo to be distributed.

20. The distribution method according to claim 16, further comprising:
    selecting an unmanned logistics distribution vehicle according to a cargo return and exchange allocation instruction being received, and providing the unmanned logistics distribution vehicle with guidance information to guide the unmanned logistics distribution vehicle to arrive at a cargo return and exchange site, so that the unmanned logistics distribution vehicle goes to the cargo return and exchange site to receive a cargo to be returned and exchanged and transport it back to the distribution station according to the guidance information.

* * * * *